Nov. 3, 1925.
H. L. DE BAUGH ET AL
1,559,940
AUTOMOBILE CURTAIN
Filed Sept. 5, 1924
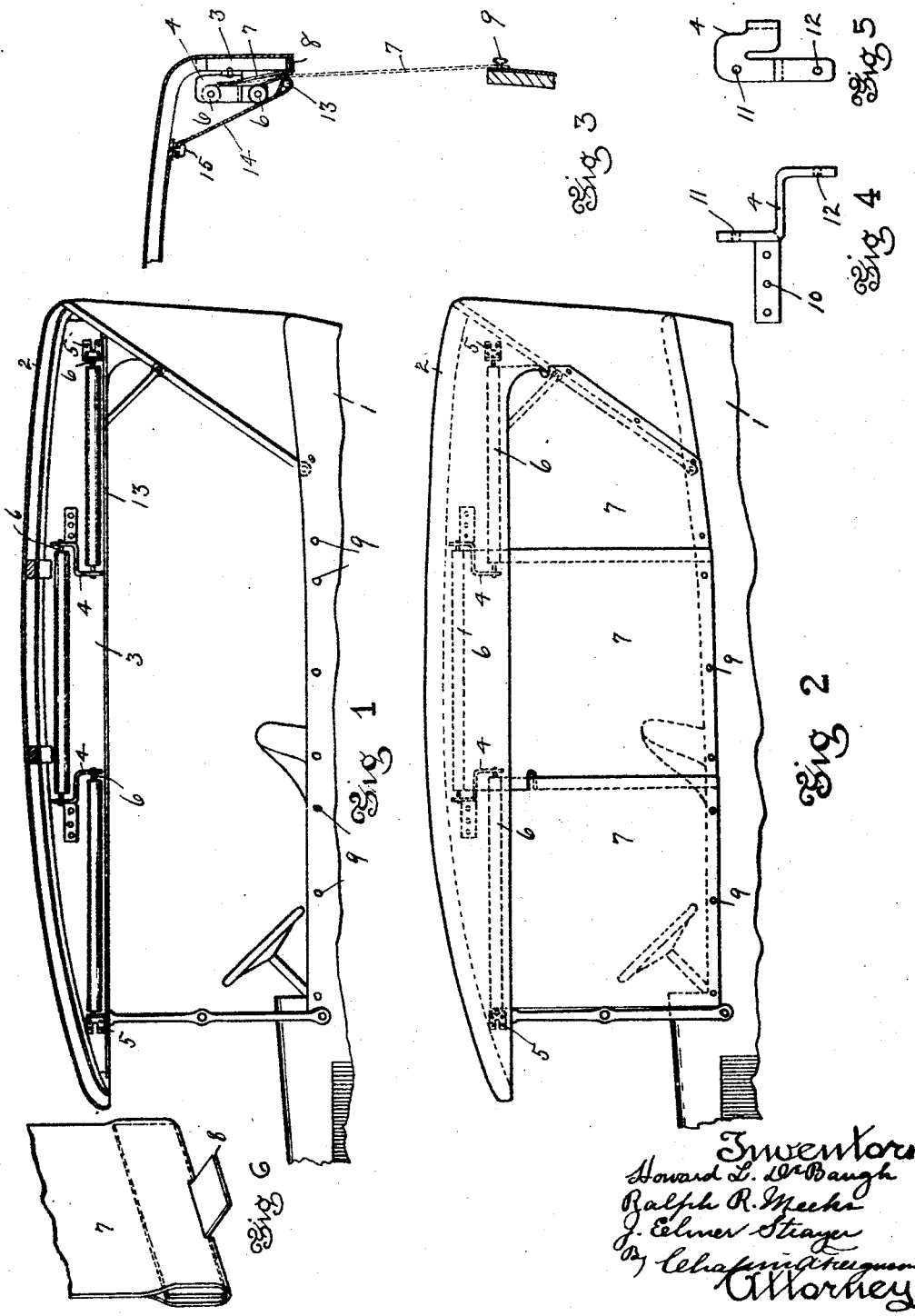

Patented Nov. 3, 1925.

1,559,940

UNITED STATES PATENT OFFICE.

HOWARD L. DE BAUGH, RALPH R. MEEKS, AND JACOB ELMER STRAYER, OF BALTIMORE, MARYLAND, ASSIGNORS TO THE SUPERIOR MANUFACTURING COMPANY, A CORPORATION OF MARYLAND.

AUTOMOBILE CURTAIN.

Application filed September 5, 1924. Serial No. 735,991.

*To all whom it may concern:*

Be it known that we, HOWARD L. DE BAUGH, RALPH R. MEEKS, and JACOB ELMER STRAYER, citizens of the United States, residing at Baltimore, in the State of Maryland, have invented certain new and useful Improvements in Automobile Curtains, of which the following is a specification.

This invention relates to improvements in automobile curtains, and has for its object to provide a simple and efficient means whereby the side curtains of an automobile are mounted upon rollers disposed along the inside of the automobile top so that they are out of the way and out of view, both from the inside and outside, when they are not in use, but which may be quickly and conveniently drawn down and secured at their lower ends in order to enclose the car when desired.

The invention consists of the novel construction and arrangement of the parts and combination of parts hereinafter more fully set forth in the following specification and pointed out in detail in the appended claim.

In the accompanying drawing,—

Figure 1 is a side view of the body of an automobile, partly in section, and showing our invention applied thereto, the curtains being shown in the raised position.

Figure 2 is a similar view to Figure 1, but showing the top in full and the curtains in the lower position.

Figure 3 is a detail section of one side of the top.

Figure 4 is an enlarged detail view of one of the brackets which carry the center roller and one end of the end rollers.

Figure 5 is an end view of Figure 4.

Figure 6 is a detail enlarged view of a portion of the lower end of the curtain taken at the center and showing the stop projecting therefrom.

Referring to the accompanying drawings, forming part of this specification, and in which like reference numerals designate like parts throughout the several views thereof, 1 designates the body of the automobile, and 2 the top thereof. On each side of the automobile top is a wooden strip 3 extending approximately the entire length thereof and secured to the top in any suitable manner, and having a number of double roller brackets 4 projecting therefrom and a roller bracket 5 at each end, in which said brackets are mounted the spring rollers 6 each having a curtain 7 secured thereto and adapted to roll thereon. Each of said curtains 7 is provided at its lower end with a stop 8 projecting therefrom and a number of snap eyes adapted to fit over the studs 9 on the body of the automobile. The brackets 4 are formed with a flat end having holes 10 for the reception of screws or nails to hold it to the strip 3 and its opposite end bent outwardly and downwardly and is provided with holes 11 and 12 to receive the ends of the center and end curtains, respectively. Extending along the top of the automobile in close proximity to the lower edge of the strip 3 is a rod 13 to which is secured one edge of a strip 14 of material, preferably the same as the inside lining of the top, and the other edge of said material 14 is provided with a number of snap eyes which fit over the studs 15 inside the top. This strip 14 serves to conceal the curtains and brackets from view, and can be readily unfastened at its upper edge to afford access to the curtains or the rollers to which they are hung. The curtains operate up and down between the rod 13 and the strip 3 and when released will be drawn up by the action of the spring rollers, the stops 8 will prevent the curtain from going up too far between the said rod and strip, and hold them in the position shown in Figure 3 of the drawing.

It will be seen that when it is desired to quickly close the car, in case of rain for instance, the curtains are drawn down and snapped over the studs 9, and when it is desired to raise said curtains they are unfastened at the bottom and will be drawn up by the action of the spring rollers on which they are mounted, until the stops 8 strike the lower edge of the strip 3 where they will be held out of view.

Having thus described our invention, what we claim is:

The combination with an automobile, of a wooden strip extending along the top of the automobile on each side thereof, a number of spring rollers mounted on said strip, a rod extending along the top of the automobile on the inside thereof adjacent the lower edge of the said wooden strip, curtains mounted on said rollers and operative between said rod and said wooden strip, stops on the bottom of said curtains, and a piece of material having one edge secured to said rod and its other edge removably secured to top of the automobile.

In testimony whereof we affix our signatures.

HOWARD L. DE BAUGH.
RALPH R. MEEKS.
J. ELMER STRAYER.